(12) United States Patent
Lin et al.

(10) Patent No.: US 12,519,715 B2
(45) Date of Patent: Jan. 6, 2026

(54) INTER-SUBNET MULTICAST TRAFFIC FORWARDING USING SUPPLEMENTAL BRIDGE DOMAIN (SBD)

(71) Applicant: Juniper Networks, Inc., Sunnyvale, CA (US)

(72) Inventors: Wen Lin, Andover, MA (US); Muniyappan Suruttaiyan, Krishnagiri (IN); Ragupathi J, Trichy (IN); Princy T. Elizabeth, Bangalore (IN); Vikram Nagarajan, Bangalore (IN); Balaji Palanisamy, Tiruppur (IN); Suraj Kumar, Bangalore (IN); SelvaKumar Sivaraj, Sunnyvale, CA (US); Anupam Kumar Singh, Bengaluru (IN); Jagadish N. Grandhi, Hyderabad (IN)

(73) Assignee: Juniper Networks, Inc., Sunnyvale, CA (US)

( * ) Notice: Subject to any disclaimer, the term of this patent is extended or adjusted under 35 U.S.C. 154(b) by 446 days.

(21) Appl. No.: 18/089,016

(22) Filed: Dec. 27, 2022

(65) Prior Publication Data
US 2024/0171500 A1    May 23, 2024

(30) Foreign Application Priority Data
Nov. 18, 2022    (IN) ............................ 202241066189

(51) Int. Cl.
*H04L 45/16* (2022.01)
*H04L 45/64* (2022.01)

(52) U.S. Cl.
CPC .............. *H04L 45/16* (2013.01); *H04L 45/64* (2013.01)

(58) Field of Classification Search
CPC ............................... H04L 45/16; H04L 45/64
See application file for complete search history.

(56) References Cited

U.S. PATENT DOCUMENTS

| 11,057,317 | B2 | 7/2021 | Elizabeth et al. |
| 2016/0277210 | A1* | 9/2016 | Lin ......................... H04L 45/16 |
| 2020/0177402 | A1* | 6/2020 | Mishra ................ H04L 67/2895 |

(Continued)

OTHER PUBLICATIONS

Extended European Search Report for Application No. EP23162151.7, mailed on Sep. 1, 2023, 8 Pages.

(Continued)

*Primary Examiner* — Walli Z Butt
(74) *Attorney, Agent, or Firm* — Harrity & Harrity, LLP (57) ABSTRACT

In some implementations, a first network device that hosts a bridge domain (BD) may receive inter-subnet multicast traffic associated with the BD. The BD may forward, using a supplemental bridge domain (SBD) interface of the first network device, and via an SBD, a first copy of the inter-subnet multicast traffic to a second network device that hosts the BD. The first network device may forward, using the SBD interface and via the SBD, a second copy of the inter-subnet multicast traffic to a third network device that does not host the BD. The first network device may forward, using an integrated routing and bridging (IRB) interface of the first network device associated with the BD, a third copy of the inter-subnet multicast traffic to a fourth network device that hosts the BD (e.g., when the fourth network device is a multihoming peer of the first network device).

20 Claims, 9 Drawing Sheets

(56) References Cited

U.S. PATENT DOCUMENTS

2021/0328794 A1* 10/2021 Mishra .................. H04L 9/3213
2022/0417059 A1* 12/2022 Nalagatla .............. H04L 12/185

OTHER PUBLICATIONS

Lin W., et al., "EVPN Optimized Inter-Subnet Multicast (OISM) Forwarding draft-ietf-bess-evpn-irb-mcast-06," Internet Engineering Task Force, Retrieved from the Internet: [URL:https://tools.ietf.org/html/draft-ietf -bess-evpn-irb-mcast-06] [retrieved on May 24, 2021], May 2021, pp. 1-77, XP015145953.

\* cited by examiner

INTER-SUBNET MULTICAST TRAFFIC FORWARDING USING SUPPLEMENTAL BRIDGE DOMAIN (SBD)

CROSS-REFERENCE TO RELATED APPLICATION

This patent application claims priority to Indian Patent Application No. 202241066189, filed on Nov. 18, 2022, and entitled "SYSTEMS AND METHODS FOR OPTIMIZED INTERSUBNET MULTICAST BRIDGE DOMAINS NOT EVERYWHERE ROUTE-TO-SUPPLEMENTAL BRIDGE DOMAIN ALONE." The disclosure of the prior application is considered part of and is incorporated by reference into this patent application.

BACKGROUND

Optimized inter-subnet multicast (OISM) is a multicast traffic optimization feature. This feature operates at Layer 2 and Layer 3 in Ethernet virtual private network virtual extensible local area network (EVPN-VXLAN) edge-routed bridging (ERB) overlay fabrics.

SUMMARY

In some implementations, a method includes receiving, by a first network device that hosts a bridge domain (BD), inter-subnet multicast traffic associated with the BD; and forwarding, by the first network device, using a supplemental bridge domain (SBD) interface of the first network device, and via an SBD, a first copy of the inter-subnet multicast traffic to a second network device that hosts the BD.

In some implementations, a first network device includes one or more memories, and one or more processors to: receive, from a second network device that hosts a BD, a first copy of inter-subnet multicast traffic associated with the BD, wherein: the first network device hosts the BD, and a third network device is multihomed to the first network device and the second network device; forward a second copy of the inter-subnet multicast traffic to at least one endpoint device; and refrain from forwarding any copy of the inter-subnet multicast traffic to the third network device.

In some implementations, a non-transitory computer-readable medium storing a set of instructions includes one or more instructions that, when executed by one or more processors of a first network device, cause the first network device to: receive inter-subnet multicast traffic associated with a BD; and forward, using an SBD interface of the first network device, a first copy of the inter-subnet multicast traffic to a second network device that hosts the BD.

DETAILED DESCRIPTION

The following detailed description of example implementations refers to the accompanying drawings. The same reference numbers in different drawings may identify the same or similar elements.

In Ethernet virtual private network (EVPN) ERB overlay fabric designs, leaf devices in the fabric route traffic between tenant bridge domains (e.g., between virtual local area networks (VLANs)). When OISM is enabled, the leaf devices route inter-subnet multicast traffic locally through integrated routing and bridging (IRB) interfaces using control plane multicast states. OISM leaf devices also selectively forward traffic into an EVPN core toward other EVPN devices with interested receivers. With OISM enabled, ERB overlay fabrics can support multicast traffic flow between devices inside and outside an EVPN fabric. The border leaf devices also include support supplemental bridge domain (SBD) inside the EVPN fabric to carry traffic from external sources toward receivers within the EVPN fabric.

However, utilizing OISM requires each leaf device to maintain a table that indicates capabilities and associations (e.g., VLAN associations) of each other leaf device within the EVPN fabric. When a number of leaf devices and/or a number of VLANs becomes large (e.g., greater than 100), the number of entries in each table becomes unwieldy. This results in the leaf devices consuming substantial computing resources (e.g., processing resources, memory resources, communication resources, and/or power resources, among other examples) to maintain the tables, which impacts a traffic forwarding and/or switching performance of the leaf devices.

Some implementations described herein provide for optimized forwarding of inter-subnet multicast traffic between provider edge (PE) network devices of a network (e.g., an EVPN network) that are associated with one or more customer edge (CE) network devices and a plurality of endpoint devices. Each PE network device may include an SBD interface, and each PE network device may be able to communicate, using the SBD interface and via an SBD, with other PE network devices, of the plurality of PE network devices, via an SBD. Accordingly, a PE network device may forward copies of inter-subnet multicast traffic to other PE network devices via the SBD.

In some implementations, a CE network device associated with a BD (e.g., a VLAN) may be multihomed to a first PE network device and a second PE network device (that are therefore both associated with the BD). The first PE network device may receive inter-subnet multicast traffic from the CE network device. In some implementations, the first PE network device may forward a copy of the inter-subnet multicast traffic to the second PE network device via the SBD. The second PE network device then may determine that it is a multihomed peer of the first PE network device for the CE network device, and may therefore refrain from forwarding a copy of the inter-subnet multicast traffic to the CE network device. Alternatively, the first PE network device may determine that it is a multihomed peer of the second PE network device for the CE network device, and may therefore forward a copy of the inter-subnet multicast traffic to the second PE network device using an IRB interface associated with the BD of the first PE network device (e.g., not via the SBD). Accordingly, the second PE network device, based on receiving the inter-subnet multicast traffic via an IRB interface associated with the BD of the second PE network device, may refrain from forwarding a copy of the inter-subnet multicast traffic to the CE network device.

In this way, some implementations enable inter-subnet multicast traffic to be forwarded from an originating endpoint device to other receiving endpoint devices, where the endpoint devices are associated with the same or different BDs (e.g., VLANs). Further, a PE network device associated with the originating endpoint device sends (e.g., using an SBD interface, or an IRB interface) the inter-subnet multicast traffic to a local PE network device (e.g., that is a multihomed peer of the PE network device), such that the inter-subnet multicast traffic is not forwarded back to the originating endpoint device or to other endpoint devices connected to the network device that is multihomed with the PE network device and the local PE network device. Further, the PE network device sends the traffic to remote PE network devices (e.g., that are not multihomed peers of the PE network device) via an SBD to allow the remote PE network devices to forward the traffic to other receiving endpoint devices associated with the remote PE network devices.

Accordingly, a PE network device described herein only needs to maintain information about whether other PE network devices are local PE network devices and/or remote PE network devices to the PE network device (e.g., for one or more BDs hosted by the PE network device). The PE network device does not need to maintain capabilities and associations of other PE network devices. Therefore, each PE network device maintains less information than that of a typical leaf device that utilizes OISM. The PE network device therefore utilizes fewer computing resources (e.g., processing resources, memory resources, communication resources, and/or power resources, among other examples) to maintain the information, which improves a performance of the PE network device as compared to a typical leaf device.

FIGS. 1A-1D are diagrams of an example implementation 100 associated with inter-subnet multicast traffic forwarding using an SBD. As shown in FIGS. 1A-1D, example implementation 100 includes a plurality of network devices, a plurality of endpoint devices, and a network. These devices and the network are described in more detail below in connection with FIG. 2 and FIG. 3.

As an example, as shown in FIGS. 1A-1D, example implementation 100 may include a plurality of PE network devices (shown as PEs 1 through 4) of a network (e.g., an EVPN network) that are associated with one or more customer edge (CE) network devices (shown as CE 1) and a plurality of endpoint devices (shown as endpoints 1 through 5). The endpoint device 1 may be connected to the CE 1, which may be multihomed to the PE 1 and the PE 2; the endpoint device 2 may be connected to the PE 2 and the PE 4; the endpoint device 3 may be connected to the PE 2; the endpoint device 4 may be connected to the PE 3; and the endpoint device 5 may be connected to the PE 4. Each endpoint device may be associated with a BD (e.g., a VLAN), and, therefore, each network device that is connected to the endpoint device may be associated with the BD. For example, each of the endpoint devices 1 and 2 may be associated with a BD A, and each of the endpoint devices 3, 4, and 5 may be associated with a BD B. Accordingly, the CE 1 may be associated with the BD A; the PE 1 may be associated with the BD A; the PE 2 may be associated with the BD A and the BD B; the PE 3 may be associated with the BD B; and the PE 4 may be associated with the BD A and the BD B.

When an endpoint device or a network device is associated with a BD, this is often referred to as the device "hosting" the BD. Accordingly, the device may include an IRB interface for communicating traffic (e.g., inter-subnet multicast traffic) associated with the hosted BD. For example, each of the endpoint devices 1 and 2 may include an IRB interface associated with the BD A, and each of the endpoint devices 3, 4, and 5 may include an IRB interface associated with the BD B. Additionally, the CE 1 may include an IRB interface associated with the BD A; the PE 1 may include an IRB interface associated with the BD A; the PE 2 may include IRB interfaces associated with the BD A and the BD B; the PE 3 may include an IRB interface associated with the BD B; and the PE 4 may include IRB interfaces associated with the BD A and the BD B. A network device associated with a BD may be configured to communicate with another network device that is associated with the BD via respective IRB interfaces of the network devices that are associated with the BD. For example, the PE 1 and the PE 2 (that are both associated with the BD A) may communicate with each other via respective IRB interfaces that are associated with the BD A.

As further shown in FIGS. 1A-1D, the PE network devices may be associated with an SBD. That is, each of the PE network devices (e.g., PEs 1 through 4) may include an SBD interface associated with an SBD and may be configured to communicate with another PE network device via the SBD (e.g., using the SBD interface of the PE network device).

The topology shown in FIGS. 1A-1D of network devices, endpoint devices, and a network is provided as an example. Other topologies of network devices, endpoint devices, and a network are contemplated.

Figure 1A:
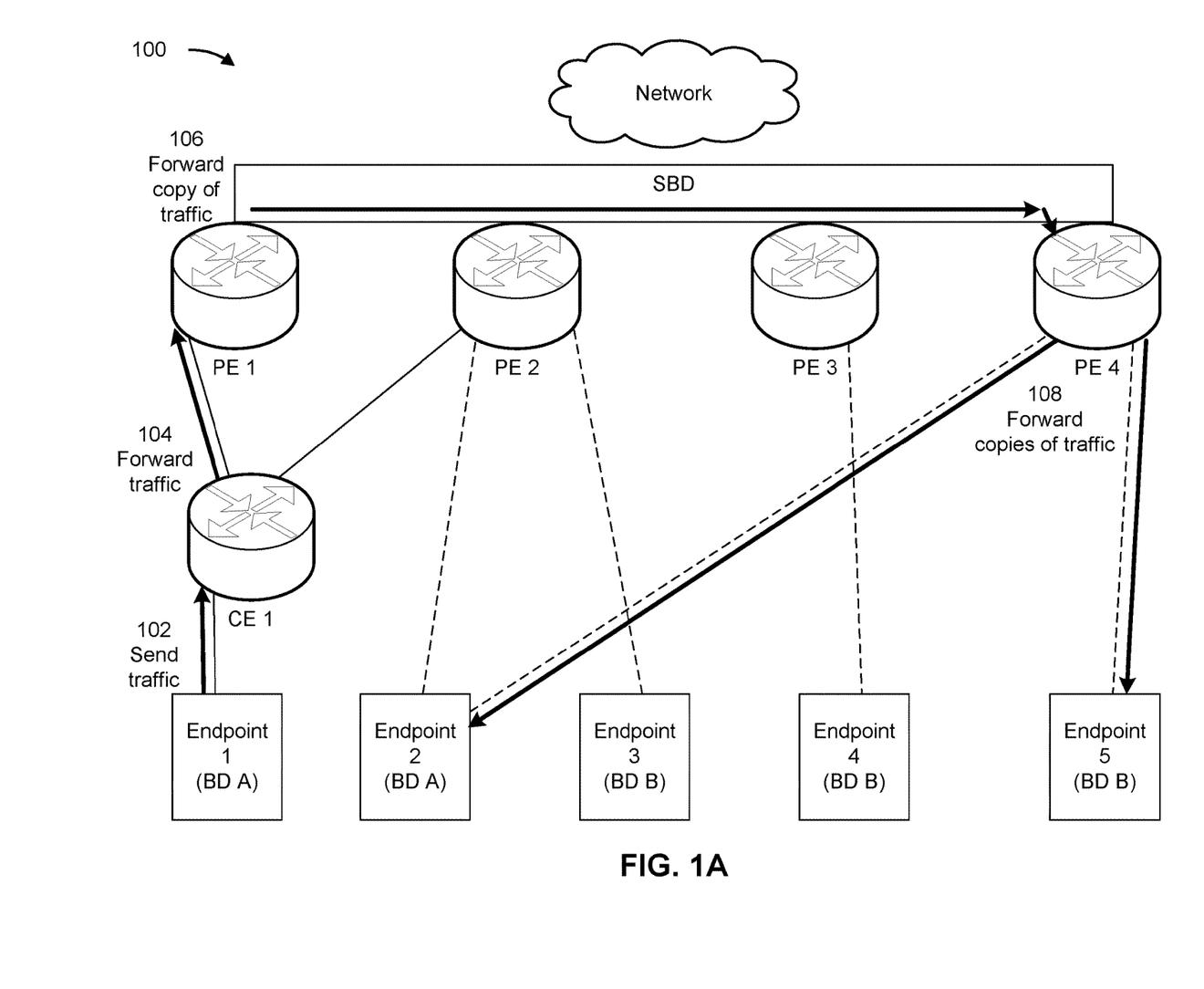
FIGS. 1A-1D are diagrams of an example implementation associated with inter-subnet multicast traffic forwarding using an SBD.

As shown in FIG. 1A, and by reference number 102, the endpoint device 1 may send traffic (e.g., inter-subnet multicast traffic) to the CE 1. The traffic may be associated with the BD A (e.g., because the endpoint device 1 is associated with the BD A). Accordingly, the endpoint device 1 may send the traffic using an IRB interface associated with the BD A of the endpoint 1, and the CE 1 may receive the traffic using an IRB interface associated with the BD A of the CE 1.

As shown by reference number 104, the CE 1 may forward the traffic (or a copy of the traffic) to the PE 1. For example, because the CE 1 is multihomed with the PE 1 and the PE 2, the CE 1 may select (e.g., using a hashing and selection technique, or another technique) one of the PE network devices to which to send the traffic, and may therefore send the traffic to the selected PE network device (e.g., PE 1). Accordingly, the CE 1 may send the traffic using an IRB interface associated with the BD A of the CE 1, and the PE 1 may receive the traffic using an IRB interface associated with the BD A of the PE 1. In some implementations, the CE 1 may send copies of the traffic to one or more other endpoint devices (not shown in FIG. 1A) that are connected to the CE 1 (e.g., in a similar manner).

As shown by reference number 106, the PE 1 may forward a copy of the traffic to the PE 4. For example, the PE 1 may process the traffic to generate a copy of the traffic and then may send the copy of the traffic to the PE 4 via the SBD. Accordingly, the PE 1 may send the copy of the traffic using the SBD interface of the PE 1, and the PE 4 may receive the traffic using the SBD interface of the PE 4. In this way, the PE 1 may forward a copy of the traffic to a PE network device that hosts the BD A.

As shown by reference number 108, the PE 4 may forward copies of the traffic to one or more endpoint devices. For example, the PE 4 may process the copy of the traffic to generate another copy of the traffic for each endpoint device connected to the PE 4, and then may send the other copy of the traffic to the endpoint device. That is, the PE 4 may send a copy of the traffic to each of the endpoint device 2 and the endpoint device 5. Accordingly, the PE 4 may send a copy of the traffic to the endpoint device 2 using an IRB interface associated with the BD A of the PE 4, and the endpoint device 2 may receive the copy of the traffic using an IRB interface associated with the BD A of the endpoint device 2. Further, the PE 4 may send a copy of the traffic to the endpoint device 5 using an IRB interface associated with the BD B of the PE 4, and the endpoint device 5 may receive the copy of the traffic using an IRB interface associated with the BD B of the endpoint device 5.

Figure 1B:
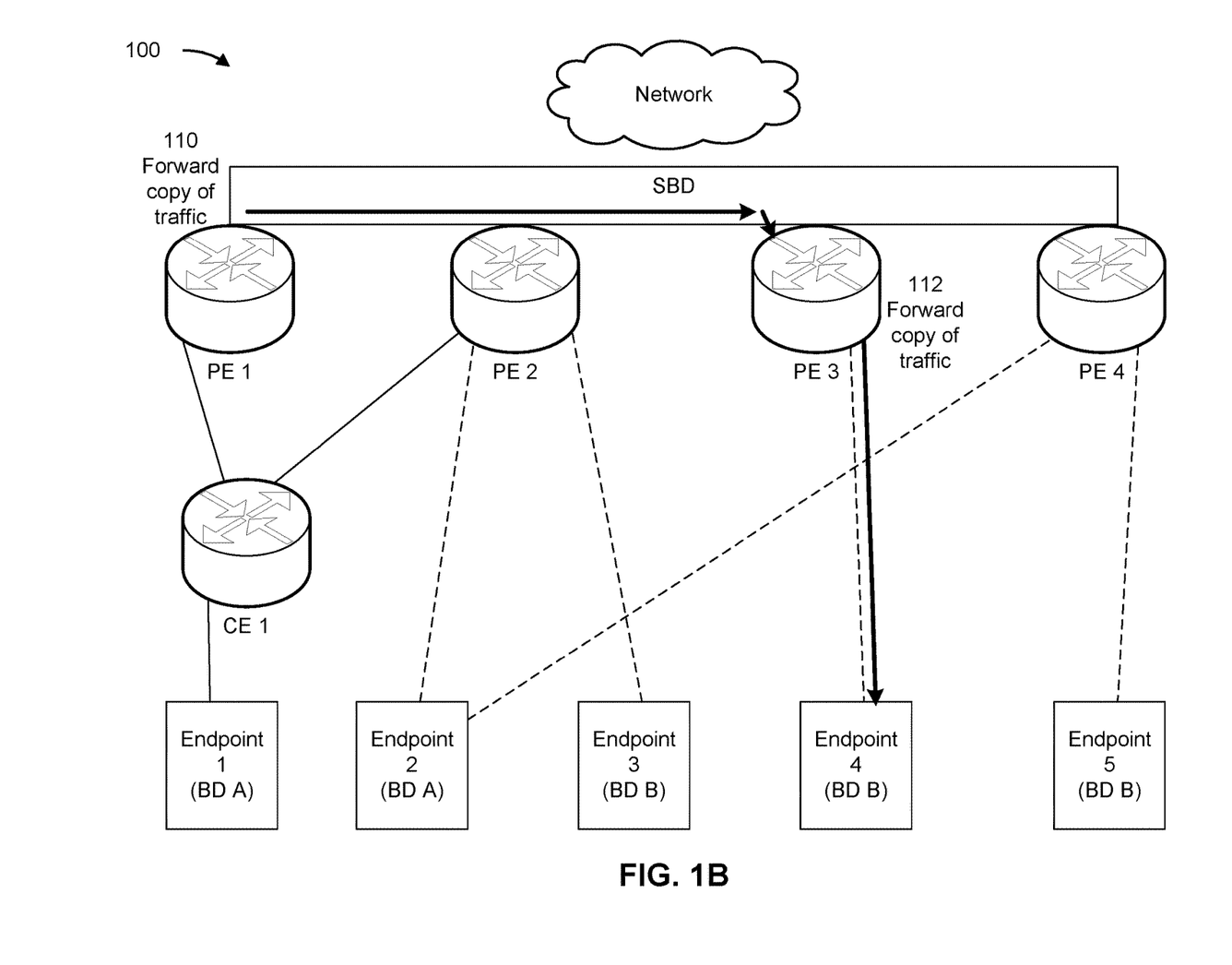

As shown in FIG. 1B, and by reference number 110, the PE 1 may forward a copy of the traffic to the PE 3. For example, the PE 1 may process the traffic to generate a copy of the traffic and then may send the copy of the traffic to the PE 3 via the SBD. Accordingly, the PE 1 may send the copy of the traffic using the SBD interface of the PE 1, and the PE 3 may receive the traffic using the SBD interface of the PE 3. In this way, the PE 1 may forward a copy of the traffic to a PE network device that does not host the BD A.

As shown by reference number 112, the PE 3 may forward copies of the traffic to one or more endpoint devices. For example, the PE 3 may process the copy of the traffic to generate another copy of the traffic for each endpoint device connected to the PE 3, and then may send the other copy of the traffic to the endpoint device. That is, the PE 3 may send a copy of the traffic to the endpoint device 4. Accordingly, the PE 3 may send a copy of the traffic to the endpoint device 4 using an IRB interface associated with the BD B of the PE 3, and the endpoint device 4 may receive the copy of the traffic using an IRB interface associated with the BD B of the endpoint device 4.

Figure 1C:
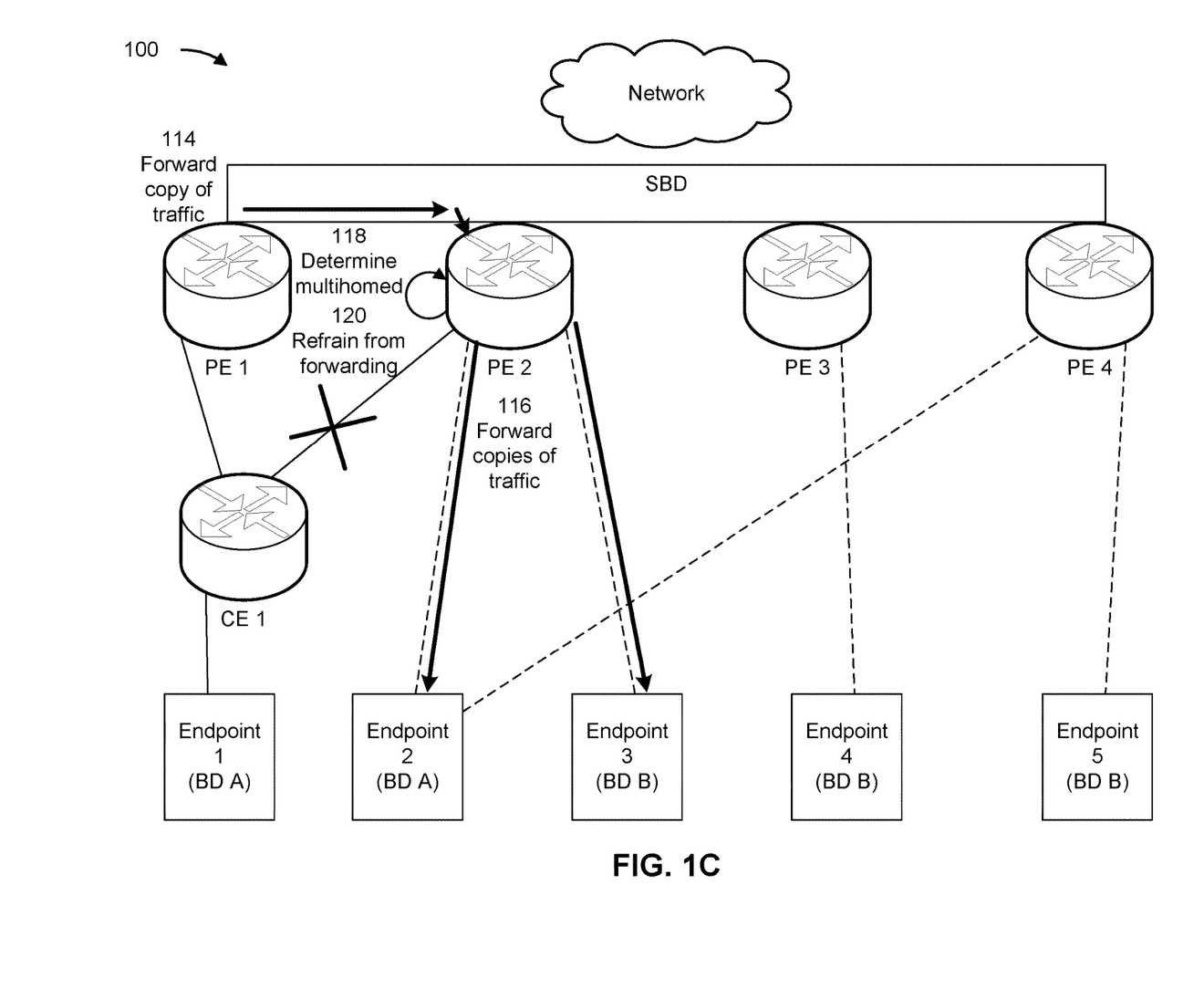

As shown in FIG. 1C, and by reference number 114, the PE 1 may forward a copy of the traffic to the PE 2. For example, the PE 1 may process the traffic to generate a copy of the traffic and then may send the copy of the traffic to the PE 2 via the SBD. Accordingly, the PE 1 may send the copy of the traffic using the SBD interface of the PE 1, and the PE 2 may receive the traffic using the SBD interface of the PE 2. In this way, the PE 1 may forward a copy of the traffic to a PE network device that hosts the BD A.

As shown by reference number 116, the PE 2 may forward copies of the traffic to one or more endpoint devices. For example, the PE 2 may process the copy of the traffic to generate another copy of the traffic for an endpoint device connected to the PE 2, and then may send the other copy of the traffic to the endpoint device. That is, the PE 2 may send a copy of the traffic to each of the endpoint device 2 and the endpoint device 3. Accordingly, the PE 2 may send a copy of the traffic to the endpoint device 2 using an IRB interface associated with the BD A of the PE 2, and the endpoint device 2 may receive the copy traffic using an IRB interface associated with the BD A of the endpoint device 2. Further, the PE 2 may send a copy of the traffic to the endpoint device 3 using an IRB interface associated with the BD B of the PE 2, and the endpoint device 3 may receive the copy of the traffic using an IRB interface associated with the BD B of the endpoint device 3.

As shown by reference number 118, the PE 2 may determine that the CE 1 is multihomed to the PE 1 and the PE 2. For example, the PE 2 may use a reverse path forwarding (RPF) analysis technique (e.g., based on the copy of the traffic), or another analysis technique, to determine that the CE 1 is multihomed to the PE 1 and the PE 2.

As another example, the PE 2 may process (e.g., parse and/or read) the copy of the traffic (e.g., a header of the copy of the traffic) to identify an address (e.g., an Internet protocol (IP) address, or another address) of the PE 1 and to identify the BD A (e.g., that the copy of the traffic is associated with the BD A). The PE 2 may identify, based on the address of the PE 1 and the BD A, an entry in a data structure (e.g., a database, a table, a file, or another electronic data structure, that is included in and/or accessible to the PE 2). That is, the PE 2 may search a data structure associated with the BD A for an entry associated with the address of the PE 1. The entry may indicate, for example, whether the PE 1 is a multihomed peer of the PE 2 for a CE device (e.g., the CE 1). Accordingly, when the entry indicates that the PE 2 is a multihomed peer of the PE 1 for the CE 1, the PE 2 may determine (e.g., based on the entry) that the CE 1 is multihomed to the PE 1 and the PE 2 (e.g., for the BD A). The PE 2 may therefore refrain from forwarding any copy of the traffic to the CE 1, as described herein in relation to reference number 120. Alternatively, when the entry indicates that the PE 2 is not a multihomed peer of the PE 1 (for any CE network device), the PE 2 may determine (e.g., based on the entry) that the PE 2 is not a multihomed peer (e.g., for the BD A). The PE 2 may therefore forward a copy of the traffic to the CE 1, in a similar manner as that described herein in relation to reference number 116.

As shown by reference number 120, the PE 2 may refrain from forwarding a copy of the traffic to the CE 1. For example, the PE 2 may determine (e.g., based on determining that the CE 1 is multihomed to the PE 1 and the PE 2, as described above) to not send a copy of the traffic to the CE 1 (e.g., because the CE 1 received the traffic from the endpoint 1, and may have already forwarded copies of the traffic to other endpoint devices connected to the CE, as described above). Accordingly, the PE 2 may refrain from forwarding the copy of the traffic to the CE 1. In this way, some implementations described herein prevent additional copies from being forwarded to endpoint devices that originated the traffic and/or that already received copies of the traffic.

Figure 1D:
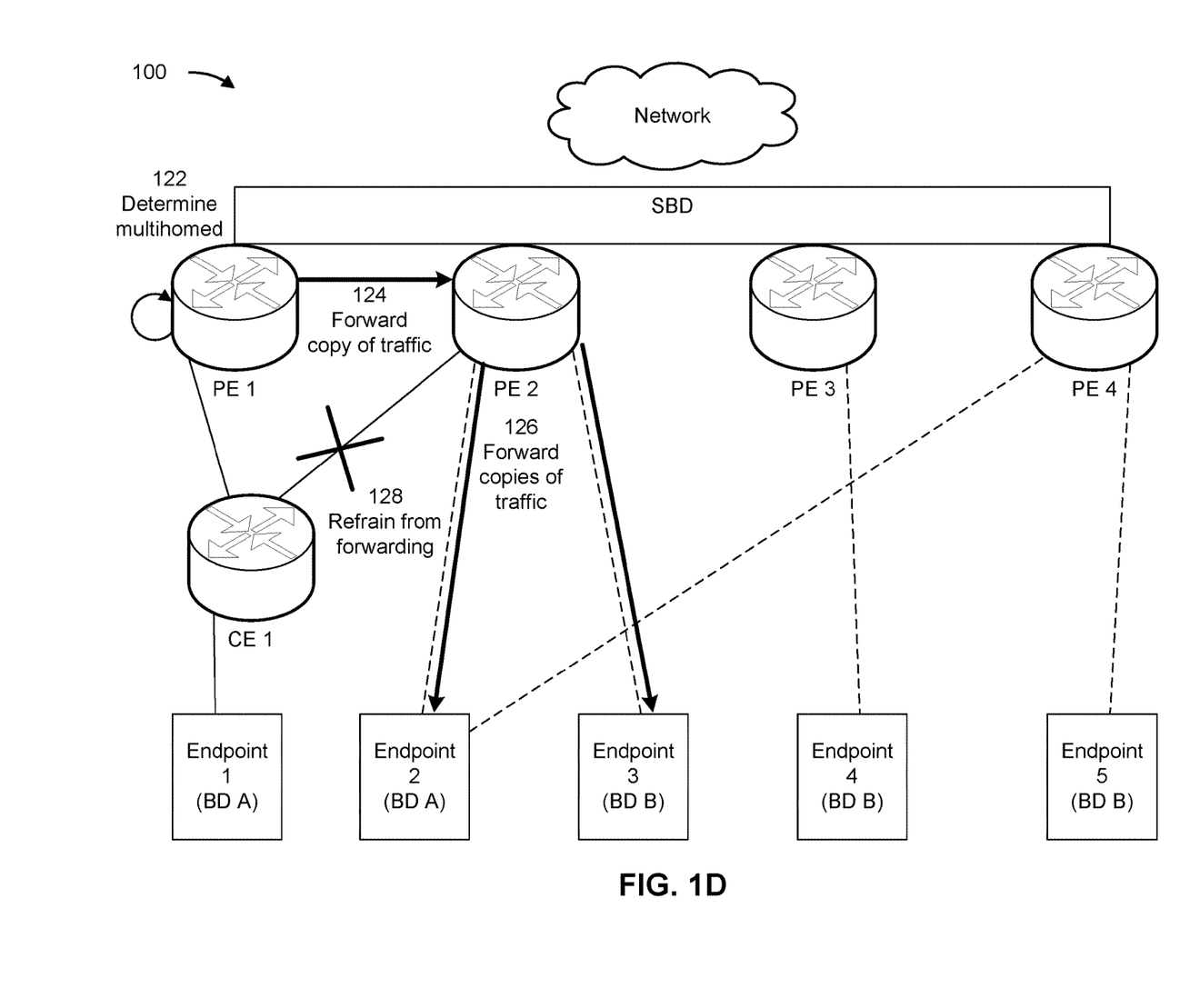

As an alternative to one or more of the processing steps described herein in relation to FIG. 1C, some implementations include one or more processing steps described herein in relation to FIG. 1D.

As shown in FIG. 1D, and by reference number 122, the PE 1 may determine that the CE 1 is multihomed to the PE 1 and the PE 2. For example, the PE 1 may use an RPF analysis technique (e.g., based on the traffic received by the PE 1 from the CE 1), or another analysis technique, to determine that the CE 1 is multihomed to the PE 1 and the PE 2.

As another example, the PE 1 may process (e.g., parse and/or read) the traffic (e.g., a header of the traffic) to identify the BD A (e.g., that the traffic is associated with the BD A). The PE 1 may identify, based on the BD A, an entry in a data structure (e.g., a database, a table, a file, or another electronic data structure, that is included in and/or accessible to the PE 1). That is, the PE 1 may search a data structure associated with the BD A for an entry that indicates, for example, whether the PE 1 is a multihomed peer for a CE device (e.g., the CE 1). Accordingly, when the entry indicates that the PE 1 is a multihomed peer of the PE 2 for the CE 1, the PE 1 may determine (e.g., based on the entry) that the CE 1 is multihomed to the PE 1 and the PE 2 (e.g., for the BD A). The PE 1 may therefore forward a copy of the traffic to the PE 2, as described herein in relation to reference number 124. Alternatively, when the entry indicates that the PE 1 is not a multihomed peer of the PE 2 (for any CE network device), the PE 1 may determine (e.g., based on the entry) that the PE 1 is not a multihomed peer (e.g., for the BD A). The PE 1 may therefore forward a copy of the traffic to PE 2, such as in a similar manner as that described herein in relation to FIG. 1A and reference number 108.

As shown by reference number 124, the PE 1 may forward a copy of the traffic to the PE 2 (e.g., based on determining that the CE 1 is multihomed to the PE 1 and the PE 2). For example, the PE 1 may process the traffic to generate a copy of the traffic and then may send the copy of the traffic to the PE 2 via the BD A (e.g., not via the SBD). Accordingly, the PE 1 may send the copy of the traffic using an IRB interface associated with the BD A of the PE 1, and the PE 2 may receive the copy of the traffic using an IRB interface associated with the BD A of the PE 2. In this way, the PE 1 may forward a copy of the traffic to a multihomed peer that hosts the BD A without using the SBD.

As shown by reference number 126, the PE 2 may forward copies of the traffic to one or more endpoint devices. For example, the PE 2 may process the copy of the traffic to generate another copy of the traffic for an endpoint device connected to the PE 2, and then may send the other copy of the traffic to the endpoint device. That is, the PE 2 may send a copy of the traffic to each of the endpoint device 2 and the endpoint device 3. Accordingly, the PE 2 may send a copy of the traffic to the endpoint device 2 using an IRB interface associated with the BD A of the PE 2, and the endpoint device 2 may receive the copy traffic using an IRB interface associated with the BD A of the endpoint device 2. Further, the PE 2 may send a copy of the traffic to the endpoint device 3 using an IRB interface associated with the BD B of the PE 2, and the endpoint device 3 may receive the copy of the traffic using an IRB interface associated with the BD B of the endpoint device 3.

As shown by reference number 128, the PE 2 may refrain from forwarding a copy of the traffic to the CE 1. For example, the PE 2 may determine (e.g., based on receiving the copy of the traffic via the IRB interface associated with the BD A of the PE 2) to not send a copy of the traffic to the CE 1 (e.g., because the CE 1 received the traffic from the endpoint 1, and may have already forwarded copies of the traffic to other endpoint devices connected to the CE, as described above). That is, the PE 2 may be configured to not forward a copy of traffic, that is received via an IRB interface of the PE 2 from another PE network device, to a CE network device (e.g., that is multihomed with the PE 2 and the other PE network device). Accordingly, the PE 2 may refrain from forwarding the copy of the traffic to the CE 1. In this way, some implementations described herein prevent additional copies from being forwarded to endpoint devices that originated the traffic and/or that already received copies of the traffic.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
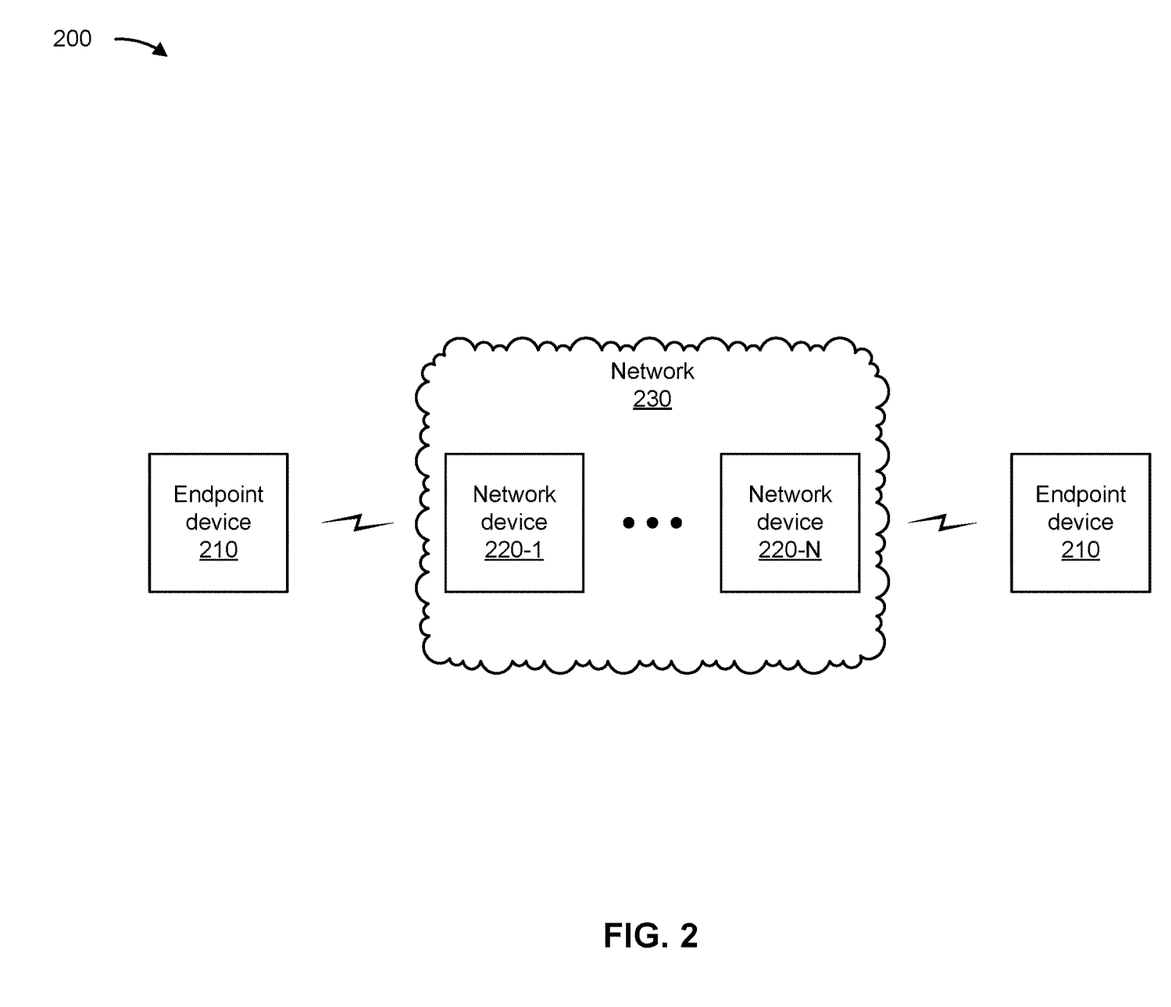
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include one or more endpoint devices 210, a group of network devices 220 (shown as network device 220-1 through network device 220-N), and a network 230. Devices of environment 200 may interconnect via wired connections, wireless connections, or a combination of wired and wireless connections.

Endpoint device 210 includes one or more devices capable of receiving, generating, storing, processing, and/or providing traffic, such as inter-subnet multicast traffic described herein. For example, endpoint device 210 may include a mobile phone (e.g., a smart phone, a radiotelephone, etc.), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, etc.), a network device, or a similar type of device. In some implementations, endpoint device 210 may receive network traffic from and/or may provide network traffic to other endpoint devices 210 via network 230 (e.g., by routing packets using network devices 220 as intermediaries).

Network device 220 includes one or more devices capable of receiving, processing, storing, routing, and/or providing traffic, such as inter-subnet multicast traffic described herein. For example, network device 220 may include a router, such as a label switching router (LSR), a label edge router (LER), an ingress router, an egress router, a provider router (e.g., a provider edge router, a provider core router, etc.), a virtual router, and/or the like. Additionally, or alternatively, network device 220 may include a gateway, a switch, a firewall, a hub, a bridge, a reverse proxy, a server (e.g., a proxy server, a cloud server, a data center server, etc.), a load balancer, and/or a similar device. In some implementations, network device 220 may be a physical device implemented within a housing, such as a chassis. In some implementations, network device 220 may be a virtual device implemented by one or more computer devices of a cloud computing environment or a data center. In some implementations, a group of network devices 220 may be a group of data center nodes that are used to route traffic flow through network 230. In some implementations, the network device 220 may be a CE network device, a PE network device, or another type of network device. In some implementations, network devices 220 may provide an EVPN multihoming topology.

Network 230 includes one or more wired and/or wireless networks. For example, network 230 may include an EVPN, an EVPN-VXLAN, a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Figure 3:
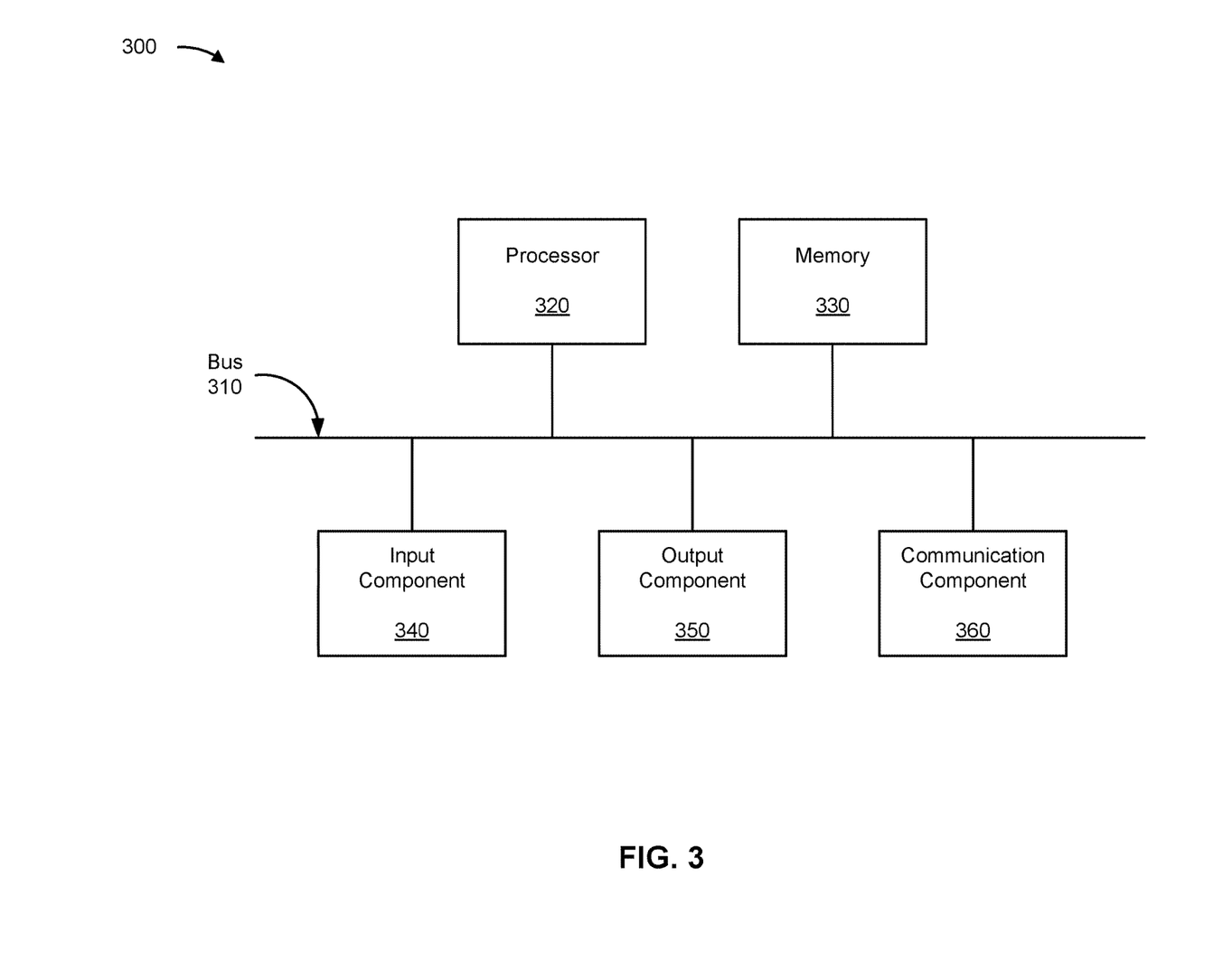
FIG. 3 is a diagram of example components of a device in which systems and/or methods described herein may be implemented.

FIG. 3 is a diagram of example components of a device 300 in which systems and/or methods described herein may be implemented. Device 300 may correspond to endpoint device 210 and/or network device 220. In some implementations, endpoint device 210 and/or network device 220 may include one or more devices 300 and/or one or more components of device 300. As shown in FIG. 3, device 300 may include a bus 310, a processor 320, a memory 330, an input component 340, an output component 350, and a communication component 360.

Bus 310 may include one or more components that enable wired and/or wireless communication among the components of device 300. Bus 310 may couple together two or more components of FIG. 3, such as via operative coupling, communicative coupling, electronic coupling, and/or electric coupling. Processor 320 may include a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 may include one or more processors capable of being programmed to perform one or more operations or processes described elsewhere herein.

Memory 330 may include volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 may include one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
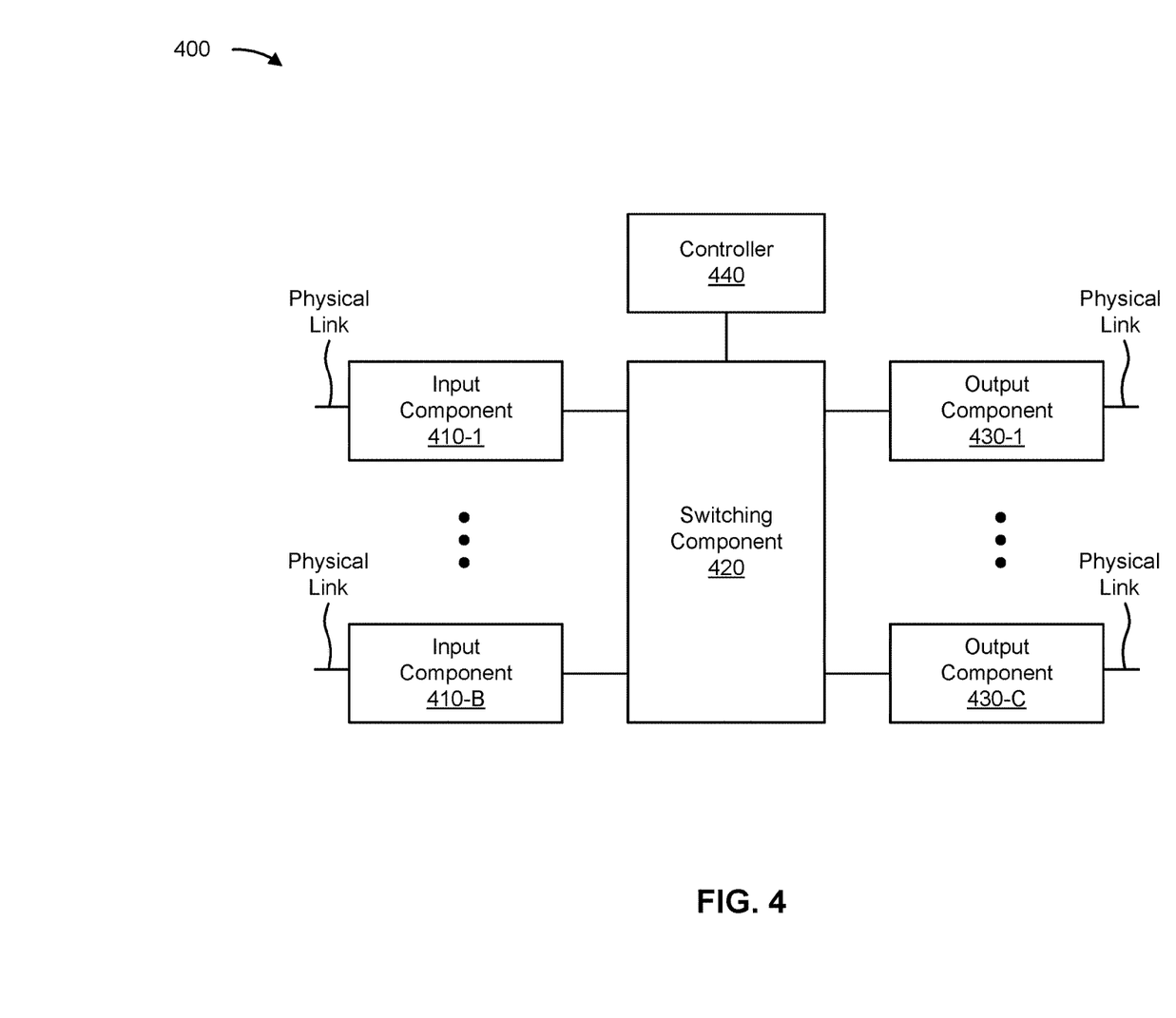
FIG. 4 is a diagram of example components of a device in which systems and/or methods described herein may be implemented.

FIG. 4 is a diagram of example components of a device 400 in which systems and/or methods described herein may be implemented. Device 400 may correspond to endpoint device 210 and/or network device 220. In some implementations, endpoint device 210 and/or network device 220 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 440 includes a processor in the form of, for example, a CPU, a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of hardware and software. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
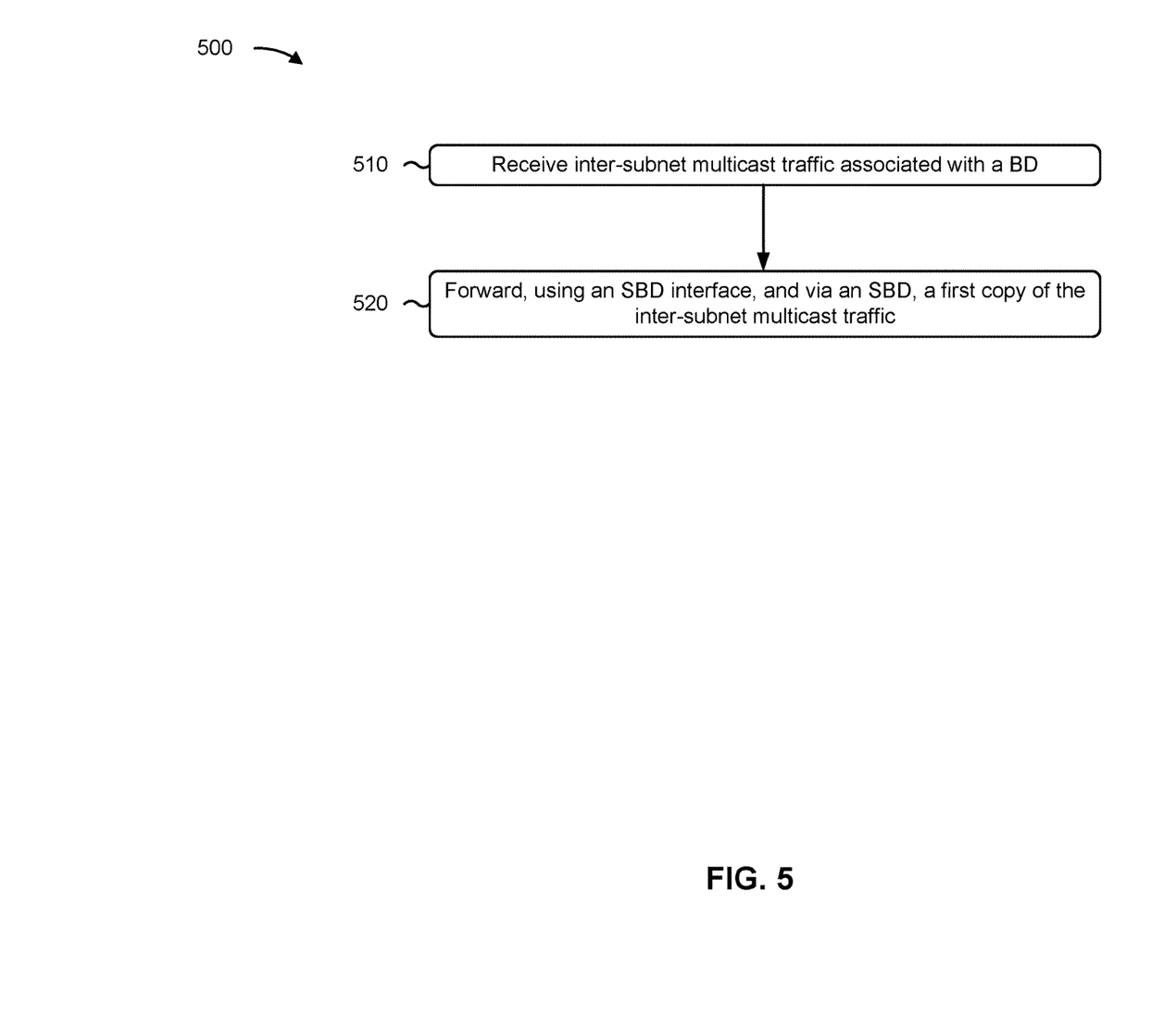
FIG. 5 is a flowchart of an example process associated with inter-subnet multicast traffic forwarding using an SBD.

FIG. 5 is a flowchart of an example process 500 associated with inter-subnet multicast traffic forwarding using an SBD. In some implementations, one or more process blocks of FIG. 5 are performed by a first network device (e.g., a network device 220, such as the PE 1 described herein). In some implementations, one or more process blocks of FIG. 5 are performed by another device or a group of devices separate from or including the first network device, such as another network device (e.g., another network device 220) and/or an endpoint device (e.g., an endpoint device 210). Additionally, or alternatively, one or more process blocks of FIG. 5 may be performed by one or more components of device 300, such as processor 320, memory 330, input component 340, output component 350, and/or communication component 360; one or more components of device 400, such as input component 410, switching component 420, output component 430, and/or controller 440; and/or another device.

As shown in FIG. 5, process 500 may include receiving inter-subnet multicast traffic associated with a BD (block 510). For example, the first network device may receive inter-subnet multicast traffic associated with a BD, as described above. In some implementations, the first network device hosts the BD.

As further shown in FIG. 5, process 500 may include forwarding, using an SBD interface of the first network device, and via an SBD, a first copy of the inter-subnet multicast traffic (block 520). For example, the first network device may forward, using an SBD interface of the first network device, and via an SBD, a first copy of the inter-subnet multicast traffic to a second network device that hosts the BD, as described above.

Process 500 may include additional implementations, such as any single implementation or any combination of implementations described below and/or in connection with one or more other processes described elsewhere herein.

In a first implementation, process 500 includes forwarding, using the SBD interface of the first network device and via the SBD, a second copy of the inter-subnet multicast traffic to a third network device that does not host the BD.

In a second implementation, alone or in combination with the first implementation, receiving the inter-subnet multicast traffic comprises receiving the inter-subnet multicast traffic from a third network device associated with the BD, and the third network device is multihomed to the first network device and the second network device.

In a third implementation, alone or in combination with one or more of the first and second implementations, forwarding the first copy of the inter-subnet multicast traffic to the second network device allows the second network device to: determine that the third network device is multihomed to the first network device and the second network device; refrain, based on determining that the third network device is multihomed to the first network device and the second network device, from forwarding any copy of the inter-subnet multicast traffic to the third network device; and forward a third copy of the inter-subnet multicast traffic to at least one endpoint device.

In a fourth implementation, alone or in combination with one or more of the first through third implementations, receiving the inter-subnet multicast traffic comprises receiving the inter-subnet multicast traffic from a third network device associated with the BD, and the third network device is multihomed to the first network device and a fourth network device that hosts the BD.

In a fifth implementation, alone or in combination with one or more of the first through fourth implementations, process 500 includes determining that the third network device is multihomed to the first network device and the fourth network device, and forwarding, based on determining that the third network device is multihomed to the first network device and the fourth network device, and using an IRB interface of the first network device associated with the BD, a second copy of the inter-subnet multicast traffic to the fourth network device.

In a sixth implementation, alone or in combination with one or more of the first through fifth implementations, forwarding the second copy of the inter-subnet multicast traffic to the fourth network device allows the fourth network device to refrain from forwarding any copy of the inter-subnet multicast traffic to the third network device, and forward a third copy of the inter-subnet multicast traffic to at least one endpoint device.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

Figure 6:
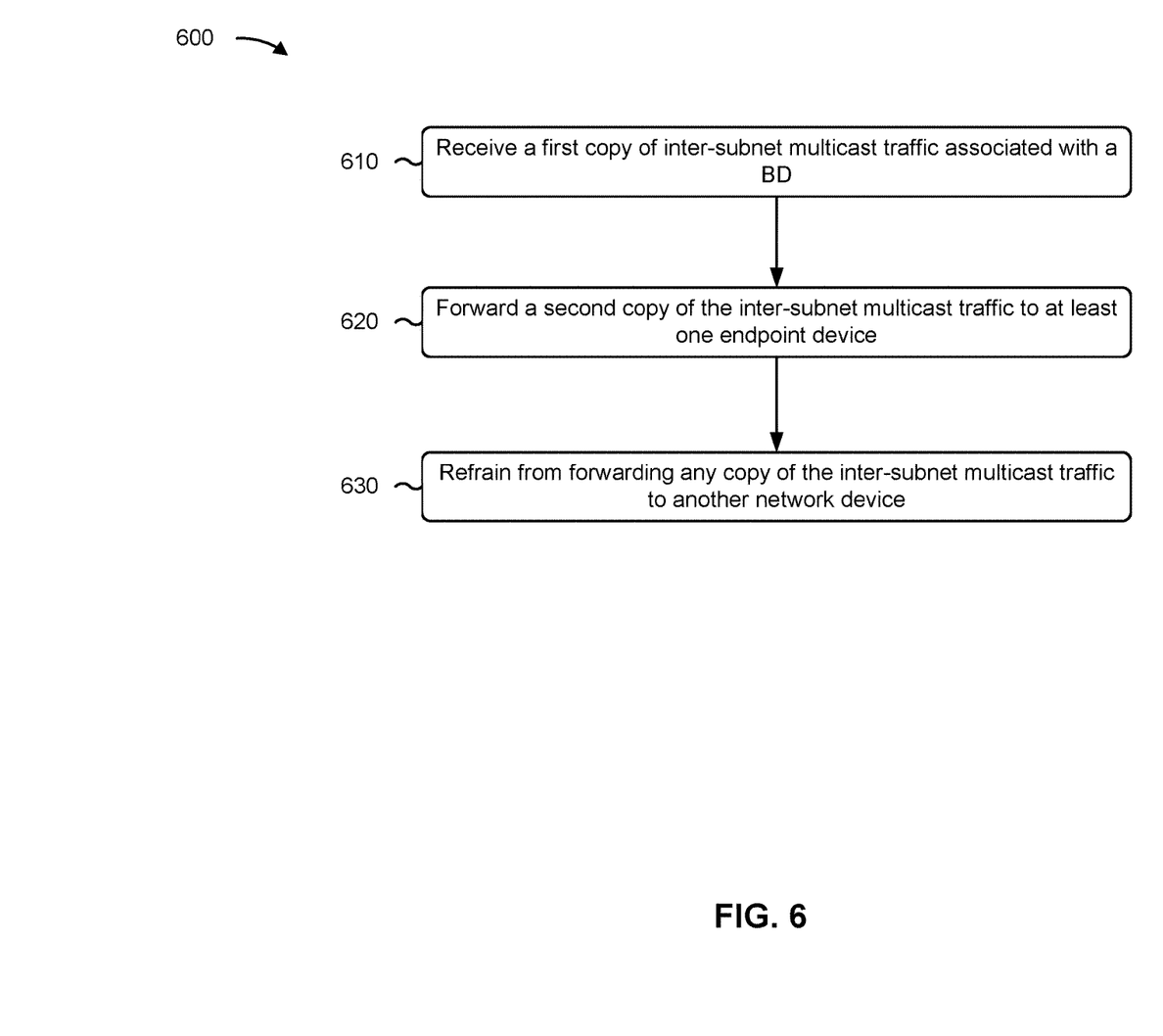
FIG. 6 is a flowchart of an example process associated with inter-subnet multicast traffic forwarding using an SBD.

FIG. 6 is a flowchart of an example process 600 associated with inter-subnet multicast traffic forwarding using an SBD. In some implementations, one or more process blocks of FIG. 6 are performed by a first network device (e.g., a network device 220, such as the PE 2 described herein). In some implementations, one or more process blocks of FIG. 6 are performed by another device or a group of devices separate from or including the first network device, such as another network device (e.g., another network device 220) and/or an endpoint device (e.g., an endpoint device 210). Additionally, or alternatively, one or more process blocks of FIG. 6 may be performed by one or more components of device 300, such as processor 320, memory 330, input component 340, output component 350, and/or communication component 360; one or more components of device 400, such as input component 410, switching component 420, output component 430, and/or controller 440; and/or another device.

As shown in FIG. 6, process 600 may include receiving a first copy of inter-subnet multicast traffic associated with a BD (block 610). For example, the first network device may receive a first copy of inter-subnet multicast traffic associated with a BD (e.g., from a second network device that hosts the BD), as described above. In some implementations, the first network device hosts the BD, and a third network device is multihomed to the first network device and the second network device.

As further shown in FIG. 6, process 600 may include forwarding a second copy of the inter-subnet multicast traffic to at least one endpoint device (block 620). For example, the first network device may forward a second copy of the inter-subnet multicast traffic to at least one endpoint device, as described above.

As further shown in FIG. 6, process 600 may include refraining from forwarding any copy of the inter-subnet multicast traffic to another network device (block 630). For example, the first network device may refrain from forwarding any copy of the inter-subnet multicast traffic to the third network device, as described above.

Process 600 may include additional implementations, such as any single implementation or any combination of implementations described below and/or in connection with one or more other processes described elsewhere herein.

In a first implementation, receiving the first copy of the inter-subnet multicast traffic comprises receiving the first copy of the inter-subnet multicast traffic via an SBD interface of the first network device.

In a second implementation, alone or in combination with the first implementation, refraining from forwarding any copy of the inter-subnet multicast traffic to the third network device includes determining that the third network device is multihomed to the first network device and the second network device, and determining, based on determining that the third network device is multihomed to the first network device and the second network device, to not send a copy of the inter-subnet multicast traffic to the third network device.

In a third implementation, alone or in combination with one or more of the first and second implementations, determining that the third network device is multihomed to the first network device and the second network device includes processing the first copy of the inter-subnet multicast traffic to identify an address of the second network device and the BD; identifying, based on the address of the second network device and the BD, an entry in a data structure; and determining, based on the entry, that the third network device is multihomed to the first network device and the second network device.

In a fourth implementation, alone or in combination with one or more of the first through third implementations, receiving the first copy of the inter-subnet multicast traffic comprises receiving the first copy of the inter-subnet multicast traffic via an IRB interface of the first network device associated with the BD.

In a fifth implementation, alone or in combination with one or more of the first through fourth implementations, refraining from forwarding any copy of the inter-subnet multicast traffic to the third network device includes determining, based on receiving the first copy of the inter-subnet multicast traffic via the IRB interface of the first network device, to not send a copy of the inter-subnet multicast traffic to the third network device.

Although FIG. 6 shows example blocks of process 600, in some implementations, process 600 includes additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. "Packet" may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
receiving, by a first network device that hosts a bridge domain (BD), inter-subnet multicast traffic associated with the BD from a multihomed network device associated with the BD; and
forwarding, by the first network device, using a supplemental bridge domain (SBD) interface of the first network device, and via an SBD, a first copy of the inter-subnet multicast traffic to a second network device that hosts the BD, wherein the multihomed network device is multihomed with the first network device and the second network device, and wherein forwarding the first copy of the inter-subnet multicast traffic to the second network device allows the second network device to:
refrain from forwarding any copy of the inter-subnet multicast traffic to the multihomed network device based on a determination that the multihomed network device is multihomed to the first network device and the second network device; and
forward another copy of the inter-subnet multicast traffic to at least one endpoint device.

2. The method of claim 1, further comprising:
forwarding, using the SBD interface of the first network device and via the SBD, a second copy of the inter-subnet multicast traffic to a multihomed network device that does not host the BD.

3. The method of claim 1, wherein:
receiving the inter-subnet multicast traffic comprises receiving the inter-subnet multicast traffic from a another multihomed network device associated with the BD, and
the other multihomed network device is multihomed to the first network device and a fourth network device that hosts the BD.

4. The method of claim 3, further comprising:
determining that the other multihomed network device is multihomed to the first network device and the fourth network device; and
forwarding, based on determining that the other multihomed network device is multihomed to the first network device and the fourth network device, and using an integrated routing and bridging (IRB) interface of the first network device associated with the BD, a second copy of the inter-subnet multicast traffic to the fourth network device.

5. The method of claim 4, wherein forwarding the second copy of the inter-subnet multicast traffic to the fourth network device allows the fourth network device to:
refrain from forwarding any copy of the inter-subnet multicast traffic to the other multihomed network device; and
forward a third copy of the inter-subnet multicast traffic to at least one endpoint device.

6. A first network device, comprising:
one or more processors; and
one or more memory devices coupled to the one or more processors, wherein the one or more processors are configured to:
receive, from a second network device that hosts a bridge domain (BD), a first copy of inter-subnet multicast traffic associated with the BD via a supplemental bridge domain (SBD) interface of the first network device, wherein:
the first network device hosts the BD, and
a multihomed network device is multihomed to the first network device and the second network device;
forward a second copy of the inter-subnet multicast traffic to at least one endpoint device; and
refrain from forwarding any copy of the inter-subnet multicast traffic to the multihomed network device based on determining that the multihomed network device is multihomed to the first network device and the second network device.

7. The first network device of claim 5, wherein to determine that the multihomed network device is multihomed to the first network device and the second network device, the one or more processors are configured to:
process the first copy of the inter-subnet multicast traffic to identify an address of the second network device and the BD;
identify, based on the address of the second network device and the BD, an entry in a data structure; and
determine, based on the entry, that the multihomed network device is multihomed to the first network device and the second network device.

8. The first network device of claim 6, wherein to receive the first copy of the inter-subnet multicast traffic, the one or more processors are configured to:
receive the first copy of the inter-subnet multicast traffic via an integrated routing and bridging (IRB) interface of the first network device associated with the BD.

9. The first network device of claim 8, wherein to refrain from forwarding any copy of the inter-subnet multicast traffic to the multihomed network device, the one or more processors are configured to:
determine, based on receiving the first copy of the inter-subnet multicast traffic via the IRB interface of the first network device, to not send a copy of the inter-subnet multicast traffic to the multihomed network device.

10. A non-transitory computer-readable medium storing a set of instructions, the set of instructions comprising:
one or more instructions that, when executed by one or more processors of a first network device, cause the first network device to:
receive inter-subnet multicast traffic associated with a bridge domain (BD) from a multihomed network device associated with the BD; and
forward, using a supplemental bridge domain (SBD) interface of the first network device, a first copy of the inter-subnet multicast traffic to a second network device that hosts the BD, wherein the multihomed network device is multihomed to the first network device and the second network device, and wherein forwarding the first copy of the inter-subnet multicast traffic to the second network device allows the second network device to:
refrain, based on a determination that the multihomed network device is multihomed to the first network device and the second network device, from forwarding any copy of the inter-subnet multicast traffic to the multihomed network device; and
forward another copy of the inter-subnet multicast traffic to at least one endpoint device.

11. The non-transitory computer-readable medium of claim 10, wherein the one or more instructions further cause the first network device to:
forward, using the SBD interface of the first network device, a second copy of the inter-subnet multicast traffic to a multihomed network device that does not host the BD.

12. The non-transitory computer-readable medium of claim 10, wherein:
the one or more instructions cause the first network device to receive the inter-subnet multicast traffic from a another multihomed network device associated with the BD, and
the other multihomed network device is multihomed to the first network device and a fourth network device that hosts the BD.

13. The non-transitory computer-readable medium of claim 12, wherein the one or more instructions further cause the first network device to:
forward, using an integrated routing and bridging (IRB) interface of the first network device associated with the BD, a second copy of the inter-subnet multicast traffic to the fourth network device.

14. The non-transitory computer-readable medium of claim 13, wherein forwarding the second copy of the inter-subnet multicast traffic to the fourth network device allows the fourth network device to:
refrain from forwarding any copy of the inter-subnet multicast traffic to the other multihomed network device.

15. The non-transitory computer-readable medium of claim 10, wherein the BD corresponds to a virtual private network.

16. The non-transitory computer-readable medium of claim 10, wherein forwarding the first copy of the inter-subnet multicast traffic to the second network device allows the second network device to:
determine that the multihomed network device is multihomed to the first network device and the second network device using a reverse path forwarding analysis.

17. The method of claim 1, wherein the BD corresponds to a virtual private network.

18. The method of claim 1, wherein forwarding the first copy of the inter-subnet multicast traffic to the second network device allows the second network device to:
determine that the multihomed network device is multihomed to the first network device and the second network device using a reverse path forwarding analysis.

19. The first network device of claim 6, wherein the BD corresponds to a virtual private network.

20. The first network device of claim 6, wherein the one or more processors are further configured to:
determine that the multihomed network device is multihomed to the first network device and the second network device using a reverse path forwarding analysis.

* * * * *